US008183811B2

(12) United States Patent
Tate

(10) Patent No.: US 8,183,811 B2
(45) Date of Patent: May 22, 2012

(54) PLATFORM SCREEN DOOR

(75) Inventor: Derek Tate, Melksham (GB)

(73) Assignee: Knorr-Bremse Rail System (UK) Limited, Melksham, Wiltshire (GB)

( * ) Notice: Subject to any disclaimer, the term of this patent is extended or adjusted under 35 U.S.C. 154(b) by 444 days.

(21) Appl. No.: 12/302,443

(22) PCT Filed: Jul. 20, 2007

(86) PCT No.: PCT/GB2007/002772
§ 371 (c)(1), (2), (4) Date: Jun. 1, 2009

(87) PCT Pub. No.: WO2007/141560
PCT Pub. Date: Dec. 13, 2007

(65) Prior Publication Data

US 2010/0063632 A1 Mar. 11, 2010

(30) Foreign Application Priority Data

Jun. 2, 2006 (GB) .................................. 0610928.4

(51) Int. Cl.
*H02P 7/00* (2006.01)

(52) U.S. Cl. ....................................... 318/466; 318/280

(58) Field of Classification Search .......... 318/264–266, 318/272, 275, 286, 486–488, 432–434, 375, 318/379, 3
See application file for complete search history.

(56) References Cited

U.S. PATENT DOCUMENTS

| | | | |
|---|---|---|---|
| 4,551,944 | A | 11/1985 | Donaldson |
| 5,134,350 | A | 7/1992 | Mahoney |
| 5,804,779 | A | 9/1998 | Fargo |
| 6,452,353 | B1 | 9/2002 | Calamatas |

FOREIGN PATENT DOCUMENTS

| | | |
|---|---|---|
| EP | 0 844 545 | 5/1998 |

*Primary Examiner* — Mark Budd
(74) *Attorney, Agent, or Firm* — Barnes & Thornburg LLP

(57) ABSTRACT

A control system for a platform screen door system. The platform screen door system includes a door configured to be opened and closed. The control system includes a door drive means and a microprocessor door drive control means configured to control an opening and closing of the door according to a predetermined profile. Also included is at least one probe configured to monitor one or both of the door drive means and a motion of the door. Further included is a controller configured to control the door drive means such that when the controller is in use the controller brakes the door drive means when a signal from the probe is outside a predetermined door operating envelope.

8 Claims, 1 Drawing Sheet

PLATFORM SCREEN DOOR

BACKGROUND AND SUMMARY

The present disclosure relates to a control system for a platform screen door system and a method of operating the closing of the doors of the platform screen door system.

The conventional railway station consisting of a raised platform adjacent to the track is essentially the same design as has been used since the beginning of the railway industry in the nineteenth century and is an effective solution to the problem of maximizing passenger boarding speed.

However, the basic platform arrangement suffers from several well known problems, such as passengers falling under trains either deliberately or unintentionally and also litter from passengers falling onto the track. Although incidents of people falling under trains are not common, they result in significant disruption to the network and are traumatic incidents for everyone present. The problem of litter on the track has also increased in recent years and can represent a serious health and safety risk on underground or sub-surface systems where the litter will remain in tunnels until it is cleared up.

Platform screen door systems, or automated platform gates, are well known in the railway industry as one approach of dealing with these problems. Due to the problem of lining up doors on the platform and the train, these systems are usually only installed on lines where the rolling stock is standardized, which in practice is on metro or underground systems, although some dedicated high speed systems are also provided with screens, or screen doors.

As the doors are quite heavy, weighing in some cases over 100 kg, and hence require a significant energy to move the door, the door and gate systems are usually provided with an obstruction detection so that a brake can be applied in the event that someone or something becomes trapped between the leading door edge and the system in the closed and locked position. Presently installed systems use microprocessor based software control to control the motor speed in accordance with predetermined characteristic profiles, in which the final portion of the door movement is comparatively slow so that in the event that someone or something becomes trapped, lower forces are applied which will not cause serious injuries.

The known systems suffer from a problem in that it is possible for the doors under microprocessor/software control to go into overspeed by overshooting the characteristic profile. Due to the nature of the injuries which could be caused by failure of the software controlling the door, it has to be validated to a minimum level of SIL2.

The present disclosure relates to an apparatus and a method for controlling the closing of a door or gate in a platform screen door system that enhances the safety of the system.

The present disclosure relates to a control system for a platform screen door system. The platform screen door system has a door drive means and a microprocessor door drive control means adapted to control the opening and closing of the door according to a predetermined profile. The control system comprises at least one probe adapted to monitor the drive means and/or door motion. The control system further comprises a controller adapted to control the door drive means, wherein, in use, the controller brakes the door drive means if a signal from the probe is outside a predetermined door operating envelope.

In an embodiment, according to the present disclosure, the drive means comprises at least one motor driven pulley and the probe is adapted to measure the current drawn by the motor that drives the pulley.

The probe is adapted to measure the speed of the door and/or the current drawn by the door drive means.

Once the door has reached a predetermined speed, the microprocessor is adapted to maintain the door at a constant speed for a predetermined time or distance and then to brake the door to a second predetermined speed. The second predetermined speed is lower than the first predetermined speed and, if the controller determines that the door speed is higher than the second predetermined speed, the drive means are braked.

The probe is a Hall probe and the time between successive rising edges of the Hall probe signals is measured such that the door speed is within limit when the current drawn between successive rising edges does not exceed a predetermined limit.

A door operating envelope has selectable operating boundaries for different doors.

The control system, according to the present disclosure, includes an advantage over the known systems by providing both obstruction detection and door overspeed control using independent hardware control, in addition to software control. Thus, safety is enhanced through redundancy and diversity.

Other aspects of the present disclosure will become apparent from the following descriptions when considered in conjunction with the accompanying drawings.

DETAILED DESCRIPTION

Figure 1:
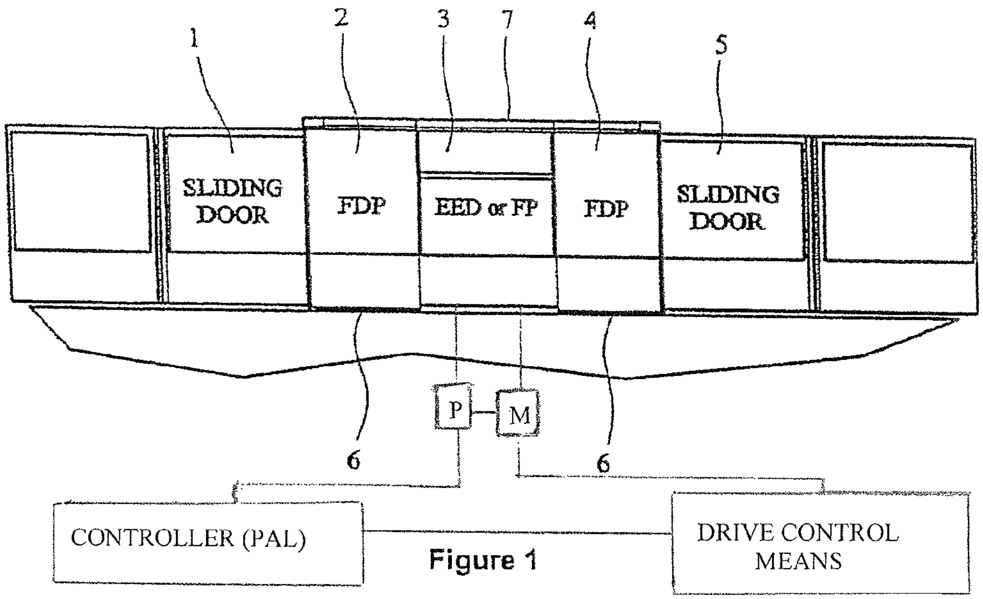
FIG. 1 shows a platform screen door system, according to the present disclosure.

FIG. 1 shows a schematic of a platform screen door system with sliding doors in a closed position on a railway platform. The screen door system includes a first sliding door 1 adjacent to a fixed driving panel 2, which fixed driving panel 2 is narrower than the sliding door 1. The fixed driving panel 2 is adjacent to a fixed panel 3, or a pivoting door, which in turn is adjacent to a further fixed driving panel 4, which is adjacent to a further sliding door 5. A guide 6 is provided at the lower edges of the fixed driving panels 2 and 4. A head structure 7 is provided on an upper edge of the fixed driving panels 2 and 4 and the fixed panel 3. The door system comprises a drive mechanism including two pairs of motor driven pulleys and two belts fixed to opposite ends of the sliding doors 1,5.

Figure 2:
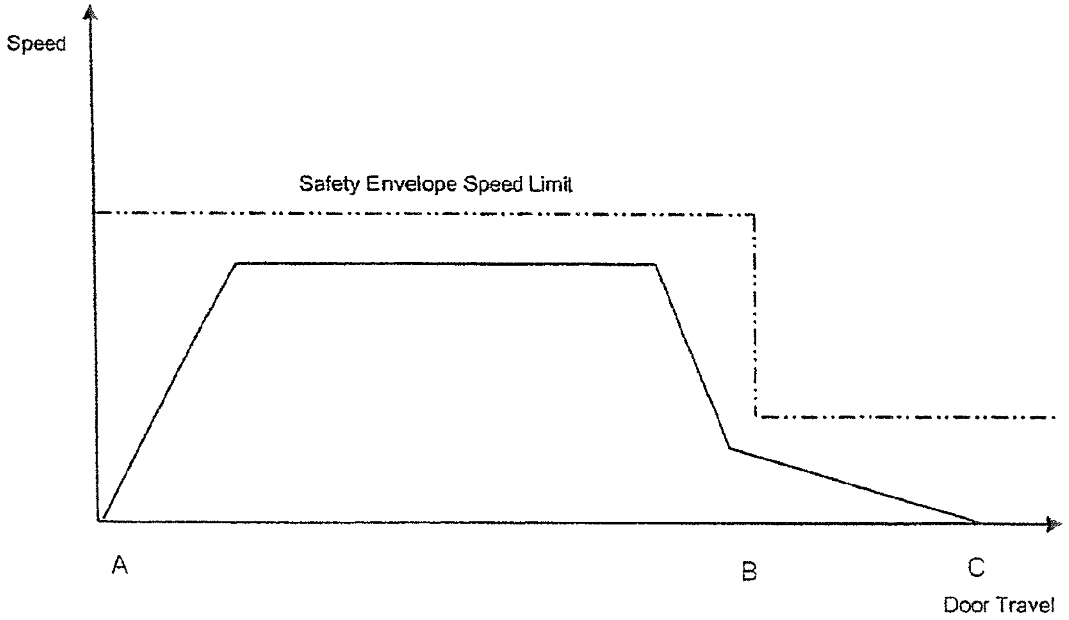
FIG. 2 shows a schematic of a speed profile for closing a door.

In known door systems, the operation of a motor M is controlled by a local microprocessor which actuates a door opening when a door open signal is received from the train, typically via the track signalling system. A door movement follows a profile, which is shown schematically in FIG. 2, where it can be seen that the door accelerates from rest to a first constant speed, during which time the door covers most of the distance between the open and closed positions. When the door is approaching the closed position, it is braked and the speed reduced sharply so that in the event of a passenger's head being trapped between the sliding door leaves, the force applied to the passenger is greatly reduced to thereby prevent the passenger being squeezed. The door speed is then slowly brought to zero at the point at which the door is in the closed position. Once in the closed position, a controller can lock the door and inform the train that the doors are closed and locked so that the train may depart.

Due to safety considerations, there are two limits defined for the energy stored in the moving door leaves. A high level for a closing leaf in a section between A and B in FIG. 2 drops to a much lower limit for the final closing section between B and C. A microprocessor is programmed during the installation of the door system so that the door speeds will follow the speed profile shown in FIG. 2 to ensure that the door does not have too much kinetic energy, which might otherwise compromise safety.

According to the present disclosure, a controller, in the form of a programmable array logic (PAL), is provided to monitor the door speed, door position and motor current from one or more motors when the door is moving. Each of the motors is provided with a Hall probe P adapted to measure the speed of the motor and the output signal of the Hall probe P is fed to the PAL. A clock and a multistage counter are provided to measure the time between successive rising edges of the Hall probe output signal with the counter being pulsed by a speedclock and being reset on each rising edge of the Hall probe signal.

To ensure that safety requirements are met, it is necessary to ensure that the energy in the door movement does not exceed predefined levels throughout its travel so that it will not cause significant injury. As with the known microprocessor software controlled solutions, the present control system includes a higher level of energy being set for most of the closing distance and a lower level being set for the final section. The energy in the door will be a function of the mass of the door. Hence, for a heavier door, the level of permitted door speed will be lower. These levels are set to be higher that the levels set in the profiles followed by the microprocessor so that unless there is a fault with the microprocessor, the microprocessor will continue to control the door closing. These levels are also lower than the levels which are generally recognized as being capable of causing injury.

The door speed is within the predefined safety limit when the multistage counter reaches a defined current speed limit between successive rising edges of the Hall probe signal. The status of this counter is buffered so that several cycles of overspeed running are allowed before overspeed is detected.

In the event that the PAL detects overspeed, then the door will be forced into braking mode by interrupting the power to the motors. The braking will remain in effect until the motor speed has dropped to a very low speed. The door speed will then be limited to a low speed limit until the doors are fully closed and locked. At that point, the motor can be released to revert to the normal profiles. In systems having more than one motor per door, in the event that overspeed in detected in any one of the motors, then all motors will be braked.

The PAL is also adapted to be able to detect whether an obstruction is present. The PAL monitors the current being drawn by the motor at all times. The PAL determines that the motor is accelerating for a set distance whenever the door speed has either dropped to a very low speed or the direction has changed. If the current being drawn by the motor exceeds a predetermined limit, then a higher limit will be set for when the door is accelerating than the limit for when the door is travelling at constant speed or decelerating, since it is likely that there is an obstruction in the door. If the current exceeds this predetermined limit for longer than the defined period, then the motors are again braked and brought to a standstill. The PAL will then reset a door control unit and disable the motor for 10 seconds, to allow the doors to be to freed from the obstruction, before returning control to the microprocessor.

It is within the scope of the present disclosure that the control system is suitable for use in both full height door systems and half height systems, in which the doors are also called gates.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A control system for a platform screen door system, the platform screen door system including a door configured to be opened and closed, the control system comprising:

a door drive means;

a microprocessor door drive control means configured to control an opening and closing of the door according to a predetermined profile;

at least one probe configured to monitor one or both of the door drive means and a motion of the door; and a controller configured to control the door drive means such that when the controller is in use the controller brakes the door drive means when a signal from the probe is outside a predetermined door operating envelope.

2. The control system according to claim 1, wherein the probe is configured to measure the speed of the door.

3. The control system according to claim 1, wherein the probe is configured to measure a current drawn by the door drive means.

4. The control system according to claim 1, wherein when the door has reached a predetermined speed, the microprocessor is configured to maintain the door movement at a constant speed for a predetermined time or distance and then to brake the movement of the door to a second predetermined speed, which second predetermined speed is lower than the first predetermined speed, and further wherein when the controller determines that the door speed is higher than the second predetermined speed, the door drive means is braked.

5. The control system according to claim 1, wherein the probe is a Hall probe.

6. The control system according to claim 5, wherein a time between successive rising edges of the Hall probe signals is measured such that the door speed is within limit when the current drawn between successive rising edges does not exceed a predetermined limit.

7. The control system according to claim 1, wherein the door operating envelope includes selectable operating boundaries for different doors.

8. The control system according to claim 1, wherein the door is a platform screen door.

* * * * *